United States Patent [19]
Jones, Jr.

[11] 3,741,659
[45] June 26, 1973

[54] BIAS CORRECTED MEASURING INSTRUMENT

[75] Inventor: J. Franklin Jones, Jr., Springfield, Vt.

[73] Assignee: The Fellows Gear Shaper Company, Springfield Windsor, Vt.

[22] Filed: June 19, 1970

[21] Appl. No.: 47,791

[52] U.S. Cl. ............... 356/109, 356/156, 33/179.5
[51] Int. Cl...... G01b 9/02, G01b 11/00, G01b 3/14
[58] Field of Search ........................... 33/169, 179.5; 356/106–113, 156

[56] References Cited
UNITED STATES PATENTS

| | | | |
|---|---|---|---|
| 2,305,264 | 12/1942 | Leonard | 73/51 |
| 2,527,338 | 10/1950 | Stamm | 356/106 |
| 2,666,267 | 1/1954 | Root | 356/106 |
| 3,263,163 | 7/1966 | Foster et al. | 33/179.5 |
| 3,279,079 | 3/1965 | Schiler | 33/169 |
| 3,377,111 | 4/1968 | Brault | 356/106 X |

*Primary Examiner*—Ronald L. Wibert
*Assistant Examiner*—Conrad Clark
*Attorney*—Cushman, Darby & Cushman

[57] ABSTRACT

A multiple coordinate measuring system of the type wherein a probe explores some feature of a part being measured and acts through a transducer or similar device to record a measurement on a chart or other record. Both the part and probe are moved along coordinated and predetermined paths so that the probe remains a fixed distance from the surface of the part being measured when the theoretical dimension corresponds to the actual dimension of the part. Detected deviations of the probe from the fixed distance represent deviations of the actual dimension from the theoretical dimension and are recorded on charts or other records. In one embodiment of the invention of this application, the actual positions of both the part being measured and the probe during measurement are continuously detected and deviations of the part and measuring instrument from their theoretical positions are detected and employed to correct the detected signals from the probe indicating the deviation of the probe from the fixed distance.

11 Claims, 4 Drawing Figures

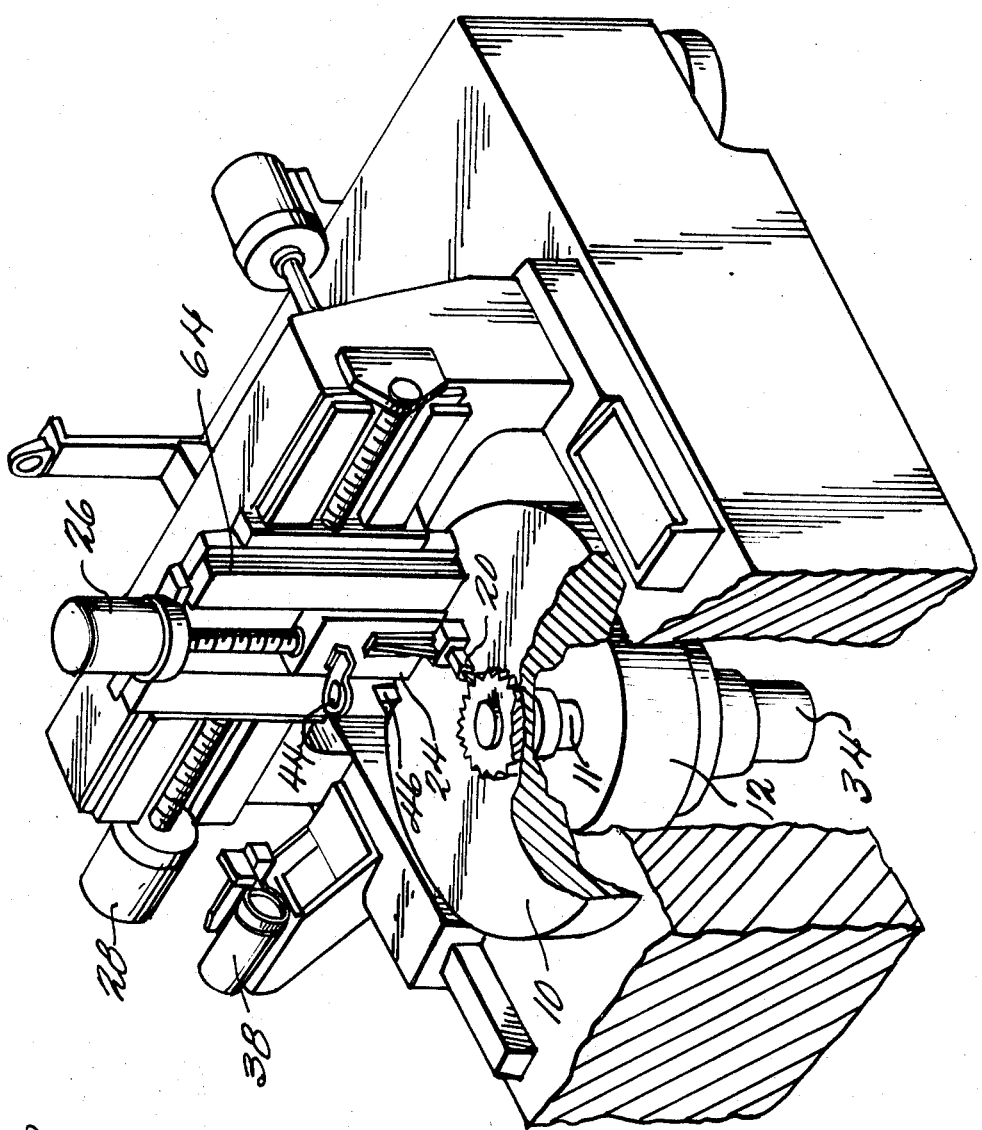

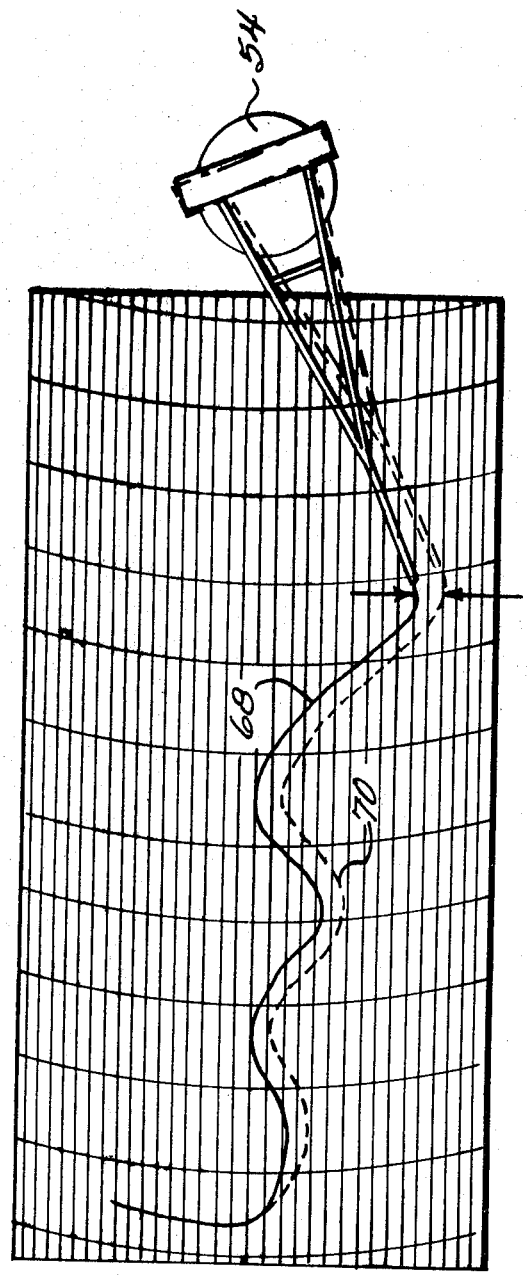

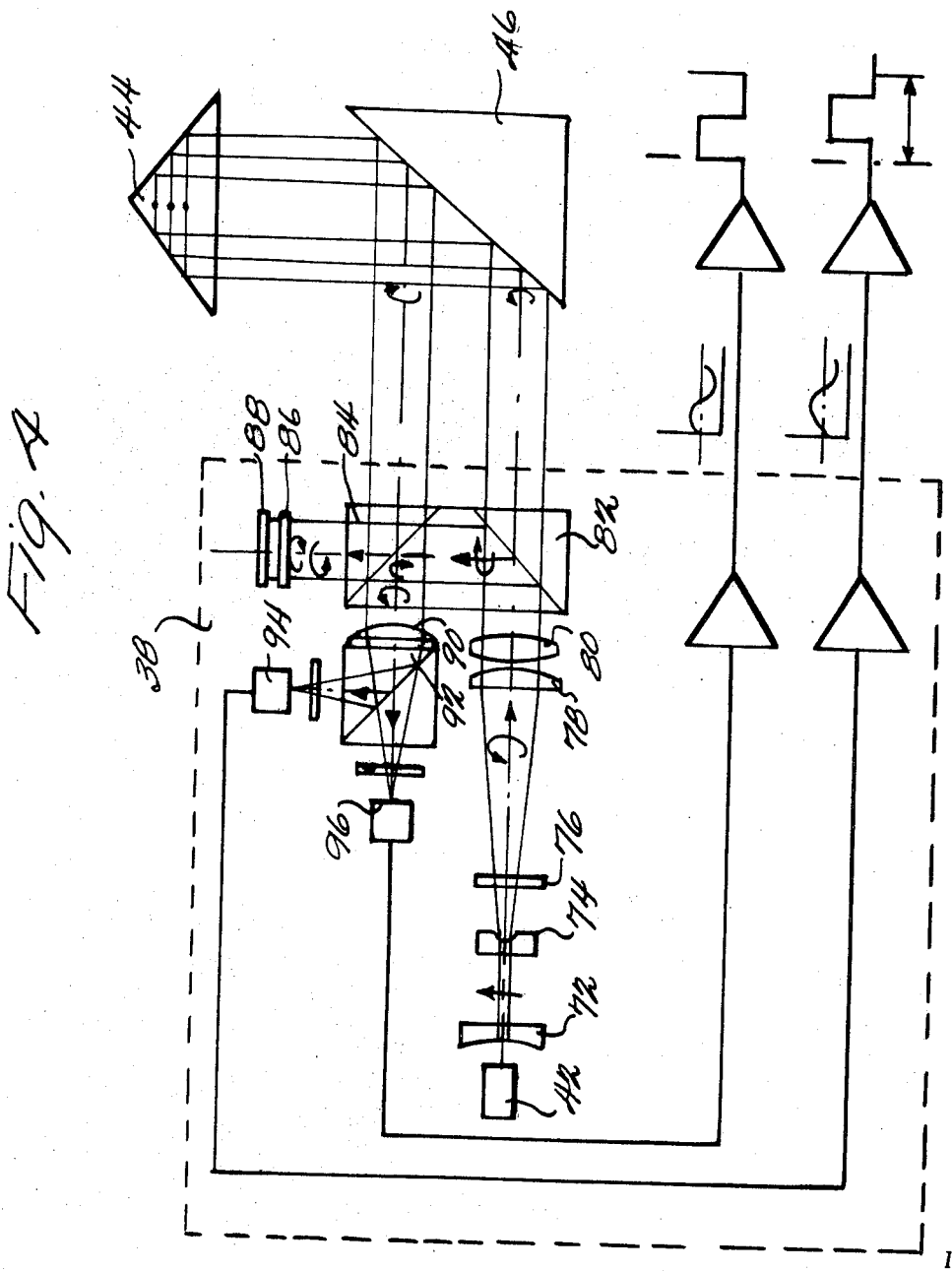

BIAS CORRECTED MEASURING INSTRUMENT

BRIEF DESCRIPTION OF THE PRIOR ART AND SUMMARY OF THE INVENTION

The invention relates to a multiple coordinate measuring instrument for measuring dimensions of a part such as a gear.

Frequently after parts having critical dimensions such as gears have been made, it is desirable to check the critical dimensions to make sure that the dimensions are within limits such that the gear will perform satisfactorily. In making gears having involuted teeth in particular, after a gear is finished it is usually desirable to check the involute of each of its teeth against the theoretical value and similarly for helical gears to check the helix angle or lead of each tooth. One machine which has been used in the past to make this type of measurement has a spindle on which the gear to be tested is mounted for rotation and a probe member which can be successively positioned adjacent each tooth surface and which can be either moved vertically or horizontally as the gear is rotated on the spindle so that, when the gear rotation and probe movements are properly coordinated, the probe member remains a fixed distance from the tooth surface being checked so that an electrical signal can be simply derived from the probe and employed to record on a chart or like deviations of the probe from the fixed distance which thus indicate deviations from the theoretical involute, helix angle or the like. One machine suitable for measuring the lead of a helix gear is shown in Bean U.S. Pat. No. 2,563,000, issued Aug. 7, 1951, and an involute measuring machine is similarly shown in Leonard U.S. Pat. No. 2,305,264, issued Dec. 15, 1942. The disclosure of both of these patents is hereby explicitly incorporated herein by reference.

One of the problems of using machines such as described in the two above mentioned patents is that the detected deviation of the probe from the fixed distance is based upon the successive theoretical positions of the moving member on which the probe is mounted and the central rotating part bearing the gear. However, for any given machine there will always be some difference at each point between the theoretical positions of the spindle and the member on which the probe is mounted which are used to calculate deviations of the probe from the fixed distance and actual physical positions. Errors inevitably occur in the construction of the measuring instrument and errors inevitably result from the use and wear of the machine, and these cumulative errors considerably limit the accuracy of the information derived from it, and thus usefulness of the machine.

The present invention relates to such a multiple coordinate measuring apparatus and method whereby the actual positions of the spindle and the member upon which the probe is mounted are continuously detected and compared with their theoretical positions which are used to determine deviations of the probe from the fixed distance. Any detected differences between the theoretical and actual positions of the spindle and member on which the probe is mounted are then used to correct the signals derived from the probe indicating the deviations of the probe from the fixed distance so that the recorder which is producing a signal chart or other record records the actual errors in the construction of the gear or other part.

In the embodiment of the invention discussed in detail below a laser interferometer is employed to continuously sense the position of the member upon which the probe is mounted, and this laser interferometer generates an electrical signal which is transmitted to a simple computer which generates the signals moving the spindle and member on which the probe is mounted. A transducer or other device mounted upon the spindle continuously monitors the actual angular position of the spindle and generates an electrical signal indicating that position which is also passed to the computer which employs it to correct the electrical signal derived from the probe and it is this corrected signal which is employed to operate the recorder.

Many other objects and purposes of the invention will become clear from the following detailed description of the drawings.

BRIEF DESCRIPTION OF THE DRAWINGS

FIG. 2 shows a cutaway view of a machine measuring the involute or other dimension of a gear, FIG. 3 shows a chart contrasting a measurement made with a machine according to this invention which continuously detects the actual position of the probe and the spindle with a machine which does not detect the actual position of the spindle and probe, and FIG. 4 shows a laser interferometer suitable for detecting the exact position of the probe at all times.

DETAILED DESCRIPTION OF THE DRAWINGS

Figure 1:
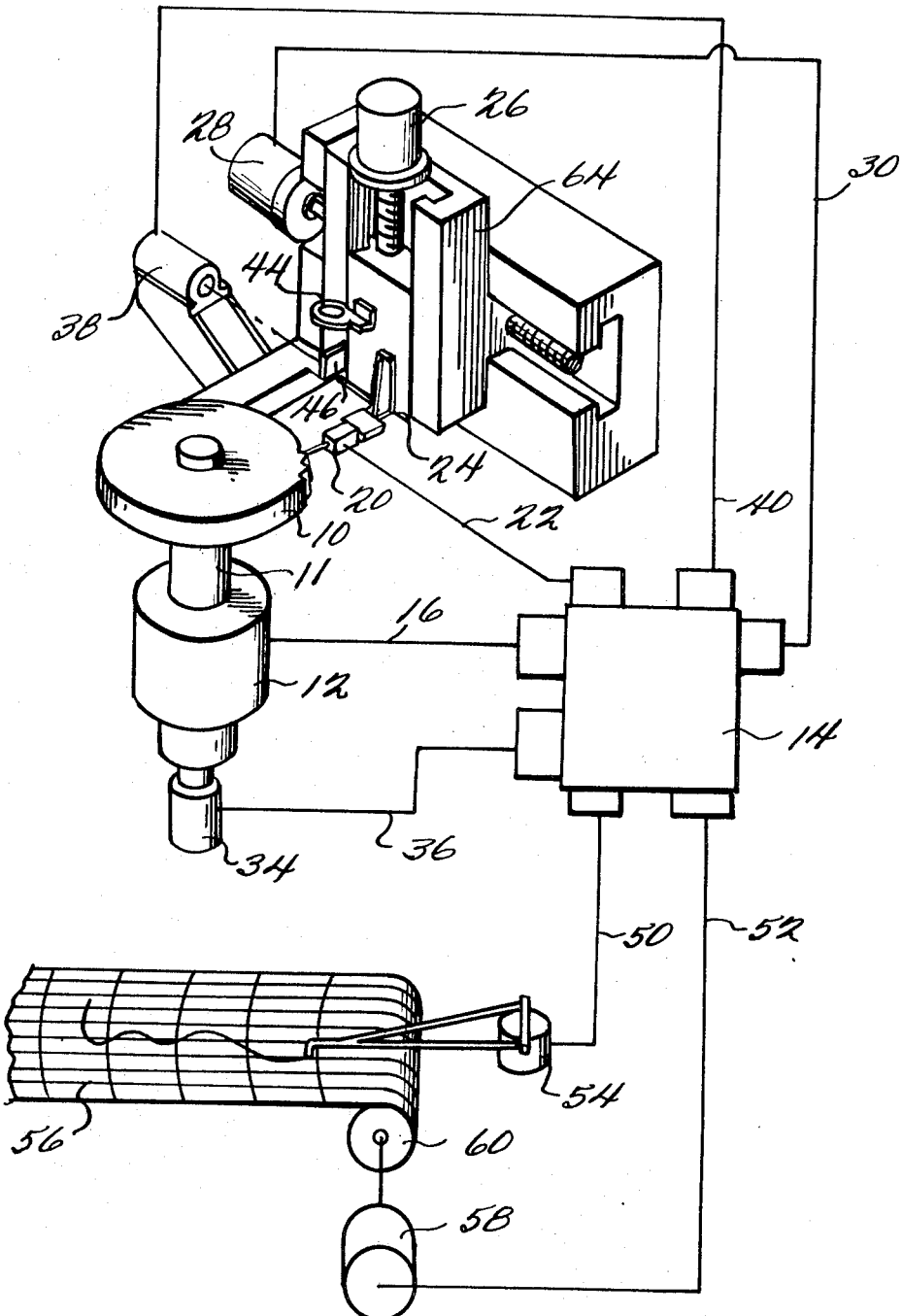
FIG. 1 shows a schematic view of the novel apparatus of this invention.

Reference is now made to FIGS. 1 and 2 which show respectively a schematic view of one embodiment of an apparatus of this invention and a cutaway view of that apparatus. This particular device is capable of measuring both the involute of each of a number of teeth of a gear or the helical angles of teeth on a helix gear. However, the general principles of this invention can be employed on other similar devices, and the invention is not intended to be limited to the measurement of these two particular gear dimensions.

As mentioned briefly above, the part whose dimension is to be measured in this instance is a gear 10 which, for measurement, is placed upon spindle 11 and held in place by any suitable means. A conventional electrical motor 12 is connected to the spindle 11 to slowly rotate gear 10 at any desired speed or in a stepwise manner, and signals derived from computer 14 on line 16 cause motor 12 to rotate this spindle as computer 14 dictates.

In order to check the involute of a tooth of gear 10, the gear is first placed on the spindle 11 as shown, and then a probe 20 is positioned adjacent one of the tooth surfaces at a fixed, predetermined distance from the tooth surface. The probe can be of the type which normally contacts the surface or of the type which is normally separated from the surface. Any suitable probe capable of determining its distance from an adjacent surface can be employed. Probe 20 generates an electrical signal which is continuously conveyed on line 22 back to computer 14 and which at all times transmits to computer 14 its distance from the adjacent tooth surface. For the purposes of this description, probe 20 is intended to include a transducer and/or other elements for generating the electrical signal. As shown, probe 20 is mounted upon slide 24 and moves with slide 24 as it is moved vertically by stepper or other motor 26, which is employed as discussed below in the measurement of helical angles of a helical gear and is not normally used in measuring the involute of a gear. Slide 24 is mounted on slide 64 and is moved horizontally by a second stepper or other electrical motor 28. Line 30 connects motor 28 to computer 14 and slide 64 moves horizontally in accordance with signals transmitted to motor 28 from computer 14.

To check on the involute of each of the teeth of given gear, computer 14 is first provided with the theoretical involute which was desired in manufacturing these gears being checked. Computer 14 then translates this into a theoretical path which probe 20 should follow to maintain a fixed distance between itself and the adjacent tooth surface as motors 12 and 28 are operated to rotate spindle 11 and move slide 64 respectively. Computer 14 then produces suitable signals on lines 16 and 30 to cause the proper coordinated movements of spindle 11 and slide 64 so that probe 20 follows the chosen path. At the same time, computer 14 detects the electrical signals produced by probe 20 indicating it separation from the adjacent tooth surface. As mentioned above, this separation is a function of the deviation of probe 20 from the fixed distance and accordingly the deviation of the involute of the tooth whose surface is adjacent probe 20 from the theoretical desired value.

As mentioned briefly above, one of the drawbacks of previous similar machines was that the theoretical positions of spindle 11 and slide 64 as determined by the computer was necessarily assumed to be the actual positions. Since this assumption is never exactly correct, the result was a built-in error. In the embodiment of this invention as illustrated in FIGS. 1 and 2, the positions of the spindle and slide respectively are continuously monitored and the electrical signals generated are compared within computer 14 with the theoretical positions and any difference between the actual positions of spindle 11 and slide 64 from their expected theoretical position then causes the signals from the probe to be corrected with the result that the signal recorded representing the inaccuracies in the gear involute or lead is much more accurate than in previous machines.

In the embodiment of the invention illustrated in FIGS. 1 and 2, the position of spindle 11 is continually monitored by an electronic transducer 34 which continuously generates a signal on line 36 which is continuously received by computer 14 and compared with the theoretical value. Similarly, a laser interferometer 38 is provided for generating a signal on line 40 indicating changes in the position of slide 24. A source of laser light 42 impinges a beam of light on prism 44 via mirror 46 so that the distance the light travels to return from prism 44 via mirror 46 which moves horizontally with slide 64 but does not move vertically with slide 24 indicates changes in position of slide 24 either vertically or horizontally, and generates an electrical signal which indicates to computer 14 the exact position of slide 24. Horizontal motion of slide 64 is also indicated.

FIG. 4 shows in detail one laser interferometer suitable for detecting the exact position of probe 20 at all times. This device is currently available from Perkin-Elmer Corporation, Electronic Products Division, Norwalk, Conn. under Model INF-1. In the device depicted in FIG. 4, monochromatic light from a helium-neon laser 42 passes through a laser dumper mirror 72, a diverger lens 74, a $\lambda/4$ plate 76, and a pair of collimating lenses 78 and 80 to a beam splitter 82.

A portion of the light incident upon beam splitter 82 is transmitted to prism 44 via mirror 46. The light incident upon prism 44 returns to interferometer 38 along a different path and encounters a second beam splitter 84. A portion of the light which impinges on beam splitter 84 from both directly from beam splitter 82 and from prism 44 passes through a polarizing screen 86 onto viewing screen 88. The remainder of the light passes through condenser lens 90 onto a third beam splitter 92. The light from beam splitter 92 is incident upon two photocells 94 and 96 which senses the fringes resulting from changes in length of the light path and which produce electrical signals as shown. The two output signals in this embodiment are in the A Quad B form and are suitable for directional sensing by means of electronic counters.

As mentioned briefly above, by using a mirror 46 which moves with slide 64 but not slide 24 and a roof prism 44 which moves with both, the interferometer can be used to detect either horizontal or vertical motion.

After comparing the theoretical and exact positions of spindle 11 and slide 24 or slide 64, the computer generates appropriate signals on lines 50 and 52 which operate the recording equipment. The signal on line 50 causes a conventional pen 54 to draw a line on chart or other paper 56 indicating the deviation of the tooth surface being tracked from the desired value. The signal on line 52 is transmitted to a motor 58 which drives a roller 60 which causes the paper 56 to be advanced. It will be understood that the signals derived from computer 14 can be employed with any other similar recorder or other device.

As mentioned briefly above, motor 26 is employed in measuring the helical curve of the teeth of a helical gear and this motor moves the second slide 24 vertically within slide 64 during the measurement of the helical curve or angle. If desired, similar transducer or laser measuring apparatus can be associated with slide 24 for measuring its position exactly and generating electrical signals which can then be conveyed to computer 14 to compensate for differences between the actual and theoretical positions of slide 24.

FIG. 3 shows in detail a typical curve 68 in solid line generated according to the apparatus of this invention. The dotted line 70 represents a similar curve which was generated in a similar apparatus which does not employ the arrangement shown in FIGS. 1 and 2 for continuously monitoring the actual positions of the spindle and slide. As it should be apparent, the novel invention of this application eliminates considerable error.

Many changes and modifications in the above embodiment of the invention can, of course, be made without departing from the scope of that invention which is intended to be limited only by the scope of the appended claims.

What is claimed is:

1. In an apparatus for measuring at least one dimension of an object and comparing it to a theoretical dimension having probe means for sensing its separation from a surface of the object, means for causing said object and probe to move relative to each other so that said probe remains a predetermined distance from said surface when the actual dimension is equal to said theoretical dimension and so that deviations of said probe from said predetermined distance are a function of the deviation of said actual dimension from said theoretical dimension and means for producing a signal having a characteristic which is a function of the separation, the improvement including:
  means for continuously detecting the actual positions of said object and probe relative to each other and for producing a signal indicating said actual positions, and
  means responsive to said signal indicating said actual positions for correcting said signal having a characteristic which is a function of said separation.

2. In an apparatus as in claim 1 wherein said causing means includes means for rotating said object about its axis, means for moving said probe along a path roughly parallel to said axis and means for coordinating the object rotation and probe movement so that said probe remains said predetermined distance from said surface when said actual dimension is equal to said theoretical dimension, the further improvement wherein said detecting means includes means for detecting the angular position of said rotating means and means for detecting the position of said moving means.

3. In an apparatus as in claim 1 wherein said probe remains in contact with said surface when said actual dimension is equal to said theoretical dimension.

4. In an apparatus as in claim 2 the further improvement wherein said means for detecting the position of said moving means is a laser interferometer.

5. In an apparatus as in claim 4, wherein said causing means further includes second means for moving said probe along a path roughly perpendicular to said axis the further improvement wherein said laser interferomenter further includes a mirror mounted on said second means for movement only along said path perpendicular to said axis and a prism mounted on said means for moving said probe along a path roughly parallel to said axis for movement along both said path perpendicular to said axis and said path parallel to said axis so that said interferometer detects motion along either said path perpendicular to said axis or said path parallel to said axis.

6. In an apparatus as in claim 2 wherein said apparatus has means for recording the corrected signal, the further improvement wherein said correcting means and said coordinating means includes a computer.

7. In an apparatus as in claim 2 wherein said causing means further includes means for moving said probe along a path perpendicular to said axis.

8. In an apparatus as in claim 6 wherein both said moving means include an electrical motor and a slide member.

9. A method of measuring at least one dimension of an object and comparing it to a theoretical dimension comprising the steps of:
  causing a probe which detects its separation from an adjacent surface to move relative to said object so that said probe remains a predetermined distance from said surface when the actual dimension is equal to said theoretical dimension and so that the deviations of said probe from said predetermined distance are a function of the deviation of said actual dimension from said theoretical dimension,
  producing a first signal having a characteristic which is a function of said separation,
  continuously detecting the actual positions of said object and probe relative to each other,
  producing a second signal having a characteristic which is a function of said actual positions, and
  using said first and second signals to produce a third signal having a characteristic which is a function of said deviation of said actual dimension from said theoretical dimension.

10. A method as in claim 9 wherein said step of causing includes the steps of causing said part to rotate about its axis and causing said probe to move along a path roughly parallel to said axis.

11. In an apparatus for measuring at least one dimension of an object and comparing it to a theoretical dimension having probe mounting means, probe means for sensing the probe mounting means separation from a surface of the object, means for causing said object and said probe mounting means to move relative to each other so that said probe mounting means remains a predetermined distance from said surface when the actual dimension is equal to said theoretical dimension and so that the deviations of said probe mounting means from said predetermined distance are a function of deviations of said actual distance from said theoretical dimension, and means for producing a signal having a characteristic which is a function of the separation, the improvement including:
  means for continuously detecting the actual position of said object and said probe mounting means relative to each other,
  means for continuously comparing this actual position to the theoretical position,
  means for producing a signal indicating the difference between the actual and the theoretical positions and
  means responsive to said signal indicating said difference for correcting said signal having a characteristic which is a function of said separation.

* * * * *